(12) United States Patent
Hasegawa

(10) Patent No.: US 7,260,108 B2
(45) Date of Patent: Aug. 21, 2007

(54) MULTIMEDIA INFORMATION PROVIDING METHOD AND APPARATUS

(75) Inventor: Koyo Hasegawa, Iwaki (JP)

(73) Assignee: Alpine Electronics Inc., Tokyo (JP)

( * ) Notice: Subject to any disclaimer, the term of this patent is extended or adjusted under 35 U.S.C. 154(b) by 1094 days.

(21) Appl. No.: 10/259,230

(22) Filed: Sep. 27, 2002

(65) Prior Publication Data

US 2003/0103524 A1 Jun. 5, 2003

(30) Foreign Application Priority Data

Oct. 5, 2001 (JP) ............................ 2001-310739

(51) Int. Cl.
*H04J 3/00* (2006.01)

(52) U.S. Cl. .................. 370/466; 370/474; 370/535; 709/231

(58) Field of Classification Search ............... 370/535, 370/536–544, 466, 474; 709/231
See application file for complete search history.

(56) References Cited

U.S. PATENT DOCUMENTS 5,533,021 A  7/1996 Branstad et al.
5,930,251 A * 7/1999 Murakami et al. ...... 370/395.65

(Continued)

FOREIGN PATENT DOCUMENTS

EP 1 100 270 A2 5/2001
JP 06-037794 2/1994
JP 09-322078 5/1996
JP 2001-142800 5/2001

OTHER PUBLICATIONS

Toga, J.; "ITU-T Standardization Activities for Interactive Multimedia Communications on Packet-Based Networks: H.323 and Related Recommendations"; *Computer Networks and ISDN Systems*; Feb. 11, 1999; pp. 205-223, XP000700319; ISSN: 0169-7552; vol. 31, No. 3, North Holland Publishing, Amsterdam, NL.

(Continued)

*Primary Examiner*—Min Jung
(74) *Attorney, Agent, or Firm*—Brinks Hofer Gilson & Lione

(57) ABSTRACT

Media for videophone communication, media for communication navigation, media for i-mode packet communication, and media for handling video data as streaming data are linked to a server so that the server can receive data from the media of each type. A user of data of different types of communication specifications performs communication by using an information terminal (e.g., in a vehicle) so as to simultaneously capture data of the different types from the server. The server converts the data of the different types into data in accordance with a single (e.g., H.323 or H.324) communication protocol, and adds codes to each type of data. The type of data is re-divided depending on a predetermined data amount for each data item, and numbers are sequentially added to the divided data segments. The divided data segments are rearranged and transmitted. The user performs a reverse process to restore the original data for use as an output.

12 Claims, 12 Drawing Sheets

U.S. PATENT DOCUMENTS

| | | |
|---|---|---|
| 5,991,313 A | 11/1999 | Tanaka et al. |
| 6,034,968 A * | 3/2000 | Park et al. .................. 370/465 |
| 6,067,303 A * | 5/2000 | Aaker et al. ................ 370/474 |
| 6,125,277 A | 9/2000 | Tanaka |
| 6,175,573 B1 * | 1/2001 | Togo et al. ................. 370/474 |
| 6,229,819 B1 | 5/2001 | Darland et al. |
| 6,400,729 B1 | 6/2002 | Shimadoi et al. |
| 6,829,254 B1 * | 12/2004 | Rajahalme et al. ......... 370/535 |
| 6,919,929 B1 * | 7/2005 | Iacobelli et al. ............ 348/589 |
| 7,007,062 B1 * | 2/2006 | Serenyi et al. .............. 709/203 |
| 2001/0033296 A1 * | 10/2001 | Fullerton et al. ........... 345/730 |
| 2006/0013266 A1 * | 1/2006 | Vega-Garcia et al. ....... 370/535 |

OTHER PUBLICATIONS

Thom, G.A.; "H. 323: The Multimedia Communications Standard for Local Area Networks"; *IEEE Communications Magazine*; Dec. 1996; pp. 52-56, XP000636454, ISSN: 0163-6804; vol. 34, No. 12, IEEE Service Center, Piscataway, NJ.

ITU-T Study Group; "ITU-T Telecommunication Standardizing Sector of ITUS: H. 323 Packet-Based Multimedia Communications Systems"; pp. 1-227, Nov. 2000; XP002320246; © ITU 2000.

* cited by examiner

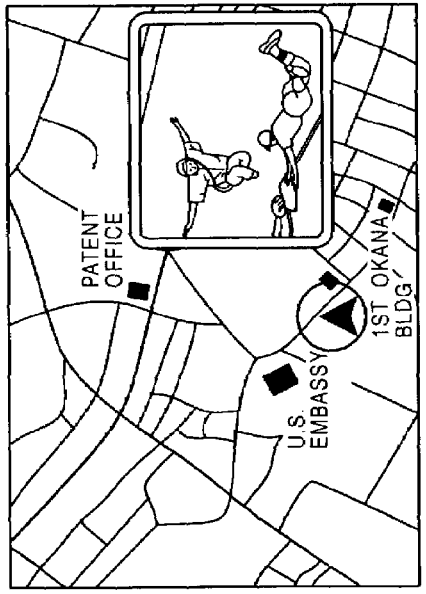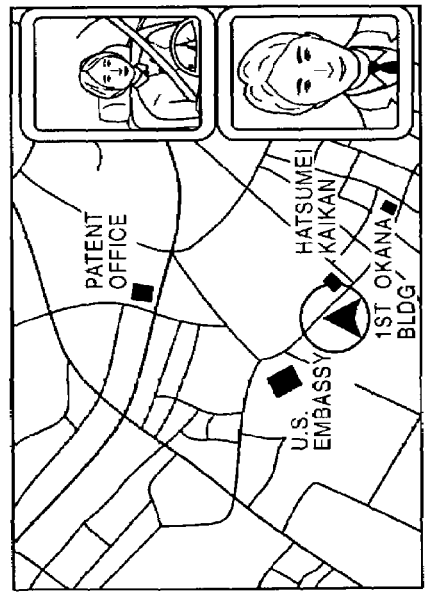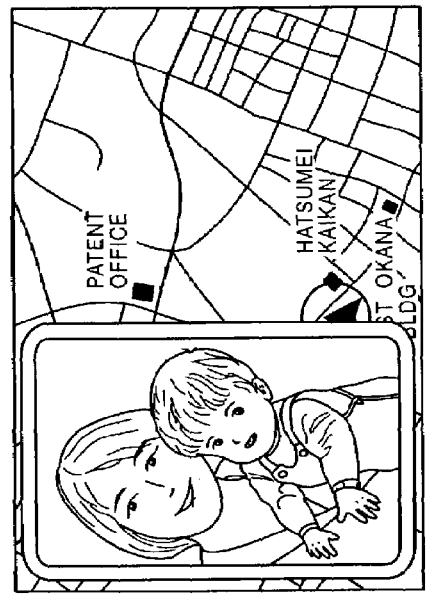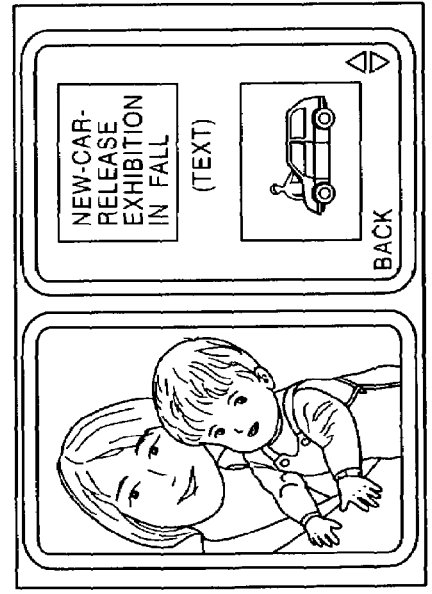

MULTIMEDIA INFORMATION PROVIDING METHOD AND APPARATUS

BACKGROUND OF THE INVENTION

1. Field of the Invention

The present invention relates to a multimedia information providing method in which various types of data having different data formats can be captured in parallel for a user in cases such as videophone communication, capturing and displaying of Internet information and video data, and capturing of map data for navigation, and to an apparatus for implementing the method.

2. Description of the Related Art

With recent advances in communication technology, enhanced performance of information processors, and the supply of products including the processors at inexpensive prices, various types of information are able to be received in homes or offices. In particular, with recent widespread use and technological progress of cellular phones, in addition to a simple telephone function, the cellular phone has had various types of multimedia transmitting and receiving functions such as a simplified Internet receiving function, a mail transmitting/receiving function, a function in which moving pictures are captured through the Internet and are displayed, a function in which audio data compressed by MP3 or the like is captured and provided for listening, and a videophone function in which, by using a built-in camera, simplified moving pictures are mutually transmitted and received with sound. These functions can easily be used by a user. Also, in offices, various types of multimedia are used, such as widespread use of videoconferencing, data sharing by intranet, and information transmission and reception by e-mail.

The widespread use of cellular phones and an increased amount of various types of communication data indicate that not only a widely-used, known frequency-division-multiple-access method which simply assigns a frequency to each user, but also even a time-division-multiple-access method which performs time division on a single frequency has limitations. In order that more people may be users, there is a code-division-multiple-access (CDMA) method which assigns a spread code to each user. The CDMA method has already been studied in a plurality of countries, and is used in some countries. Also, in Japan, "Wide-band CDMA (W-CDMA)" has been developed for cellular phones. Internationally, the creation of a world standard method plan is in process in the International Telecommunication Union. Since this method enables high speed communication, it is expected that the method as a type of CDMA may mainly be used.

In addition, in recent years, navigation devices have widely been used in vehicles, and in these devices, a large amount of information such as map information and information of various facilities such as restaurants and amusement facilities can be recorded in information recording media such as digital versatile disks (DVDs), along with images. This enables a user to display a desired map in accordance with the movement of the position of the user's vehicle and to drive the vehicle along a guidance path displayed by the navigation device. In this guidance, the user is guided through right and left turns and intersections by using enlarged screens and audio guidance, so that the user can easily and safely drive the vehicle to a destination. Also, by retrieving peripheral facilities, information of stopovers and restaurants can be obtained.

This type of navigation device has also had a communication function. Accordingly, by connecting a cellular phone to the navigation device, various types of driving-related information can be received from an information providing center. Moreover, various types of information can be captured such as the reception of video and audio data, including reception from various Internet sites. In particular, unlike the cellular phone, the navigation device is large in size and has a larger high-definition screen and a relatively high-performance information processor. Thus, it is expected that the navigation device will be essential as an in-vehicle multimedia terminal in the future.

As described above, in a navigation device, the large amount of data stored in a DVD or the like must generally be updated according to necessity because, among the data, map data and facility information are modified year by year. For updating, an upgrade version of the DVD (DVD-ROM) must continually be purchased, and a maintenance fee is also needed. In addition, since a navigation device is expensive, a navigation device having similar level functions is also demanded. In one solution, it is possible that, by using widely-used, known communication technology and a cellular phone, as described above, and disclosing the map and facility information recorded in the DVD, the data can be updated as required, and it is possible that detailed information and video and audio can be distributed. Actually, part of the solution is practiced.

By using the above data distribution method, the user can perform the activities of downloading and displaying a desired map on the screen, setting a destination, transmitting the destination to an information center with present-position data based on a global positioning system, requesting the information center to compute a guidance path, driving the vehicle along the path, and requesting the information center to transmit the map data required for traveling. In addition to this type of system, it is possible that various other types can be implemented. These systems are generically called a "communication navigation system".

As described above, particularly based on the widespread use of cellular phones and advances in communication technology, it is possible that various types of common communication systems can be used. One of them is a circuit-switching videophone communication system as shown in FIG. 10A. FIG. 10A shows a case in which person A who possesses a portable information terminal 51 having a videophone function formed by a video camera 50 and a communication function is communicating with person B as the wife of person A who is using a cellular phone 54 having a videophone function using a video camera 52. In this case, a communication network 55 employing a W-CDMA method that is expected to be widely used in the future is used, and communication is established by 64-kbps circuit switching.

In addition, as FIG. 10B shows, circuit-switching video delivery is possible. In this video delivery, a W-CDMA communication network 55 similar to that shown in FIG. 10A is used, a content provider 56 is connected to a video delivery server 57 by a cable, and the video delivery server 57 is connected to the W-CDMA communication network 55 by a cable. In response to a video delivery request from a cellular phone 58 linked to the W-CDMA communication network 55, the video delivery server 57 receives pictures provided by the content provider 56. FIG. 10B also shows a case in which a baseball broadcast from the content provider 56 is audiovisually provided to a user by using the cellular phone 58.

As FIG. 11A shows, data communication using the i-mode service as a simplified cellular-phone Internet function, which is becoming popular, has functions similar to those in the case using the Internet, and it is possible that more information can be delivered at higher speed. In the case in FIG. 1A, a content provider 56 linked to an Internet network 60 can deliver various types of multimedia information including video and sound which are stored in an information holder by the Internet network 60, and an i-mode center 61 connected to the Internet network 60 can convert the multimedia information into cellular phone data and can transmit the cellular phone data to a cellular phone 62 through a W-CDMA network 55. In this case, catalog data of a new car which is stored in the content provider 56 is transmitted with video in response to a request from the cellular phone 62.

Moreover, FIG. 11B shows a case in which audio communication between a W-CDMA network 55 and a cellular phone 63 is established and data communication related thereto is also performed. It is expected, as a usage form in the future, that this type of demand will be made in many cases. In these cases, the audio communication is performed by circuit switching, and the data communication is performed by packet switching. Thus, in a common usage form in the future, two links are used to perform the two types of communication.

In the cases shown in FIGS. 10A and 10B, and 11A and 11B, the original functions of the cellular phone are used to perform various types of communication so that various types of information are captured. This is not limited to the cellular phone, but also applies to a navigation device connected to the cellular phone, as described above. Specifically, in FIG. 10A, by using a navigation device having a communication function instead of the portable information terminal 51, connecting a video camera in a predetermined position in the vehicle to the navigation device, and using a hands-free unit or the like, the driver can easily use the navigation device. In addition, reception of delivered video as shown in FIG. 10B, reception of provided multimedia information as shown in FIG. 11A, and communication using two links are similarly possible.

By using the W-CDMA network, which is expected to be widely used in the future, information devices, such as cellular phones, navigation devices, and portable information terminals, can obtain types of multimedia information at any time, as required. This is not limited to mobile devices of the above types. Also, in the case of displaying various types of information on a television screen in an ordinary home by using an ordinary telephone line, a similar function can be used.

In addition, inexpensive flat rates of communication will become widely used, and it is expected that a continuous-link type of usage form will be widely used in which a link to a desired party will be made as required, with connection to a communication network maintained, and in which information capture from a videophone and the Internet can be performed, and data is continuously captured and is displayed as required. Even when a metered rate system is employed in which downloading of specified information is charged depending on the used amount, multimedia information can become very inexpensively used, and widespread use of this usage form is expected.

In the above delivery of multimedia information, for videophone circuit switching as shown in FIG. 10A, the H.324 specifications for real-time multimedia communication is used to perform communication, and when packet switching is used to perform videophone communication, H.323 is used. Also, the HTTP specifications are used to perform i-mode packet-switching data capturing and capturing of streaming information that is audiovisually provided while being downloaded. For downloading and using a map, etc., by using a communication navigation device, the WinSock specifications are used.

As described above, types of multimedia information differ in delivery standard and specification, that is, their protocols differ. Accordingly, for example, in order that the multimedia information may be delivered to a cellular phone or a navigation device, the device must have a function of handling data in accordance with each communication standard and specification. An information delivery server of the related art can only deliver requested data in accordance with a predetermined protocol in response to a request from a client. The client cannot receive and display information from the server which is based on a protocol that the client does not support.

Also, in communication through a server among a plurality of clients, as it is impossible to establish a link between a circuit-switching videophone and a packet-switching videophone, communication is impossible unless the corresponding functions and protocols of the clients match.

In a case in which an information terminal has a function of handling all the types of multimedia information, a built-in information processor must receive the multimedia information by using high speed multi-task processing to switch protocols. For this purpose, a high performance central processing unit (CPU) must be used because a common CPU cannot simultaneously receive real-time data, such as audio and video, and picture data and Web data on the Internet.

FIG. 12 shows a case in which a navigation device having a receiving function adapted for a plurality of protocols is of a communication navigation type that downloads and uses map data. The navigation device uses packet-switching information service by using an i-mode browser in accordance with HTTP. When receiving a circuit-switching real-time videophone call in accordance with H.324 during the i-mode service, the navigation device cannot display the call. A person who sends the call is supplied with information indicating that the other party's device is communicating with another. The person must call again later.

After that, the navigation device in FIG. 12 uses subsequent WinSock communication to capture data of communication navigation for data transmission and reception, and receives streaming video and audio delivered in accordance with HTTP after capturing the data. FIG. 12 also shows a state in which, by using the navigation device, a baseball game broadcast is audiovisually received in the form shown in FIG. 10B. While the navigation device is receiving the data of the broadcast, a state as described above that is unable to receive the videophone call from the wife continues. For each type of multimedia information, the information terminal simply performs processing by switching the protocols in response to a user's information-capturing request. This causes a problem in that the types of multimedia information cannot simultaneously be displayed.

SUMMARY OF THE INVENTION

It is an object of the present invention to provide a multimedia information providing method in which various types of multimedia information having different communication specifications can simultaneously be received and displayed on a single screen, and in which combinations of types of displayed information can arbitrarily be switched for use, and an apparatus for implementing the method.

To this end, according to an aspect of the present invention, a multimedia information providing method is provided which includes: the steps, performed by a data processor, of receiving data of different types of communication specifications; converting the received data into data of a single specification type, adding an identifier to each of the data types and dividing the obtained data into data segments, and sequentially arranging the divided data segments and transmitting the arranged data segments; and the steps, performed by an information terminal, of receiving the transmitted data segments, re-dividing the received data segments into the divided data segments, sequentially rearranging the divided data segments for each identifier, and providing the rearranged data segments for each identifier as an output.

Preferably, the single specification type is a streaming protocol. The streaming protocol may be one of the H.323 communication protocol and the H.324 communication protocol.

Sequence numbers for each identifier may be added to the divided data segments, and the data segments having sequence numbers added thereto may be rearranged based on the identifier and the sequence numbers.

The data of different types of communication specifications may include Internet data, videophone data, and communication navigation data.

According to another aspect of the present invention, a multimedia information providing apparatus including a data processor is provided. The data processor includes a data receiving unit for receiving data of different types of communication specifications, a data converting unit for converting the received data into data of a single specification type, a single-communication-specification-data dividing unit for adding an identifier to each of the data types and dividing the obtained data into data segments, a single-communication-specifications-data arranging unit for arranging the divided data segments, and a data transmitting unit for transmitting the arranged data segments.

Preferably, the single specification type is a streaming protocol.

The single-communication-specification-data arranging unit may include a data-transmission-priority setting unit for arranging the divided data segments in accordance with a data-transmission priority. The data-transmission priority may be one of a predetermined priority, a priority which is set beforehand by a user, a priority which is determined by a transmission-data capacity, and a priority which is changed in response to a request from the user.

The data of different types of communication specifications may be communication data for uses including the Internet, videophone communication, and communication navigation.

According to another aspect of the present invention, a multimedia information providing apparatus including an information terminal is provided. The information terminal includes a data receiving unit for receiving data from a data processor converting data of different types of communication specifications into data of a single specification type, dividing the obtained data into data segments, sequentially arranging the divided data segments for each identifier, and transmitting the arranged data segments, a re-dividing unit for re-dividing the received data into the divided data segments, sequentially rearranging the divided data segments for each identifier, and a data output unit for providing the rearranged data segments for each identifier as an output.

Preferably, the single specification type is a streaming protocol.

The data of different types of communication specifications may be communication data for uses including Internet data, videophone data, and communication navigation data.

The information terminal may be one of a cellular phone, a communication navigation device, and a portable information terminal.

The information terminal may notify the data processor of one of a protocol and a function which are adapted for the information terminal.

The information terminal may display multimedia information of a plurality of types.

According to another aspect of the present invention, a multimedia information providing system is provided which includes a data processor and an information terminal. The data processor includes a data receiving unit for receiving data of different types of communication specifications, a data converting unit for converting the received data into data of a single specification type, a single-communication-specification-data dividing unit for adding an identifier to each of the data types and dividing the obtained data into data segments, a single-communication-specifications-data arranging unit for arranging the divided data segments, and a data transmitting unit for transmitting the arranged data segments. The information terminal includes a data receiving unit for receiving data from a data processor converting data of different types of communication specifications into data of a single specification type, dividing the obtained data into data segments, sequentially arranging the divided data segments for each identifier, and transmitting the arranged data segments, a re-dividing unit for re-dividing the received data into the divided data segments, sequentially rearranging the divided data segments for each identifier, and a data output unit for outputting the rearranged data segments for each identifier.

Preferably, the single specification type is a streaming protocol, and the streaming protocol is one of the H.323 communication protocol and the H.324 communication protocol.

Sequence numbers for each identifier may be added to the divided data segments, and the data segments having sequence numbers added thereto may be rearranged based on the identifier and the sequence numbers.

The data of different types of communication specifications may include Internet data, videophone data, and communication navigation data.

According to the present invention, even multimedia information of different types of communication specifications can be received simultaneously and displayed on a single screen. In addition, simultaneous audio output is possible. In addition, combinations of displayed information of different types can be switched for use.

According to the present invention, moving pictures can be displayed in real time, and multimedia information of different types can easily be handled. This can be practiced only by modifying part of the function of a video conference system performing communication in accordance with a streaming protocol.

According to the present invention, data can be transmitted in a form in which the segments of data are freely arranged, and data transmission can be performed in accordance with a priority of each data type.

According to the present invention, by simply providing a device with a single data processing function, widely-used-HTTP Internet data, H.323 or H.324 protocol videophone data, and WinSock communication navigation data can simultaneously be handled.

According to the present invention, data transmission can be managed in accordance with the need of multimedia information of each type. Thus, a multimedia information providing apparatus which is convenient for a user is provided.

According to the present invention, data can be transmitted and received at various priorities, matching a user's preference or the need of data processing by the device. Thus, a user-friendly multimedia information providing apparatus is provided.

According to the present invention, with a widely used cellular phone, multimedia information of every type can simultaneously be used anytime and anyplace. In addition, when the present invention is applied to a communication navigation device, information of various types can simultaneously be used without being affected by received map data which is captured as required, and a relative large screen is used to display multimedia information of different types. When the present invention is applied to a portable information terminal, a relatively high-performance data processor is used to easily handle multimedia information of different types at any location.

BRIEF DESCRIPTION OF THE DRAWINGS

FIGS. 5A, 5B, 5C, and 5D are illustrations of multimedia information displayed on a screen in the present invention;

FIG. 10A shows a first communication model in which videophone communication between two parties is performed, and FIG. 10B shows a second communication model in which streaming picture data is received from a content provider by using circuit switching and is displayed on a videophone;

FIG. 11A shows a third common communication model in which packet-switching data is captured from a content provider by i-mode service and is displayed on a cellular phone, and FIG. 11B shows a fourth common communication model in which circuit-switching audio communication and packet-switching data communication from a W-CDMA network are performed by using two links.

DESCRIPTION OF THE PREFERRED EMBODIMENTS

Figure 1:
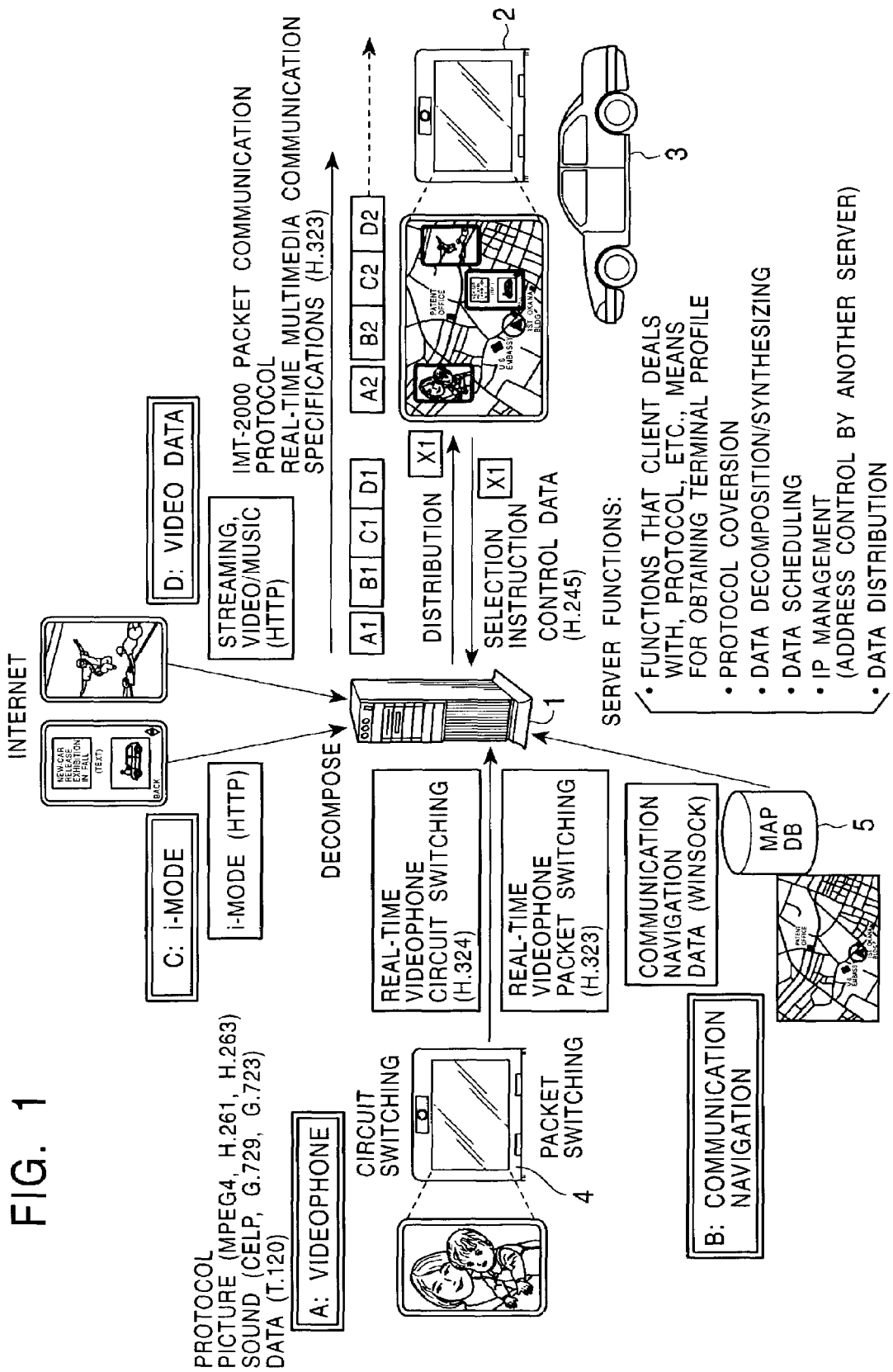
FIG. 1 is a schematic system illustration of the configuration and functions of devices according to an embodiment of the present invention.

An embodiment of the present invention is described below with reference to the accompanying drawings. FIG. 1 shows the functions of a multimedia server 1 that implements the present invention. In the form shown in FIG. 1, the multimedia server 1 can receive a videophone call from media A, communication-navigation map data from media B, an i-mode call from media C, and Internet streaming video data from media D. In response to a data distribution request from a portable information terminal 2 having a communication function for linking to the multimedia server 1, the above different types of data are synthesized and delivered by the multimedia server 1 in accordance with the communication protocol based on IMT-2000 (International Mobile Telecommunications-2000).

In FIG. 1, media A functions as a real-time videophone in accordance with the H.324 communication specifications by using telephone circuit switching or functions as a real-time videophone in accordance with the H.323 communication specifications by using packet switching. FIG. 1 shows a state wherein a man in a vehicle 3 receives a videophone call, including video of the man's wife and child, from a portable information terminal 4. In a protocol for the videophone, video communication is performed based on a standard such as MPEG-4, H.261, or H.263, and audio communication is performed based on a standard such as CELP, G.729, or G.723. Data according to the T.120 specification is formed and is used for communication.

In the communication navigation with media B, in response to a request from a user, data in a map database 5 at an information center or the like is delivered in the form of a map of the area around a predetermined point. The delivery is performed by using Window's Socket Interface (WinSock) protocol. In i-mode communication with media C, information is received from the Internet in the form of packets. FIG. 1 shows a state in which catalog data of a newly released car, including a picture, is received. Regarding the video data handled by media D, moving pictures are transmitted based on a streaming HTTP protocol. FIG. 1 also shows a baseball game being transmitted. Here, not only pictures but also sound is transmitted, and also music data can be transmitted separately.

The multimedia server 1 has the ability to deal with the protocol of each type of media and to perform processing for different types of media in parallel. In the case in FIG. 1, the man, that is, the user in the vehicle 3 uses the portable information terminal 2 to transmit an instruction X1 for selection of media A to media D to the multimedia server 1 in control data of the H.245 specification. In response to the instruction, the multimedia server 1 receives and converts data for each selected media into H.323 specification data as the IMT-2000 communication protocol. The multimedia server 1 generates data corresponding to the user's instruction X1 by performing decomposition and synthesizing (described later) of the converted data, and transmits the data to the portable information terminal 2 for the user.

Figure 2A:
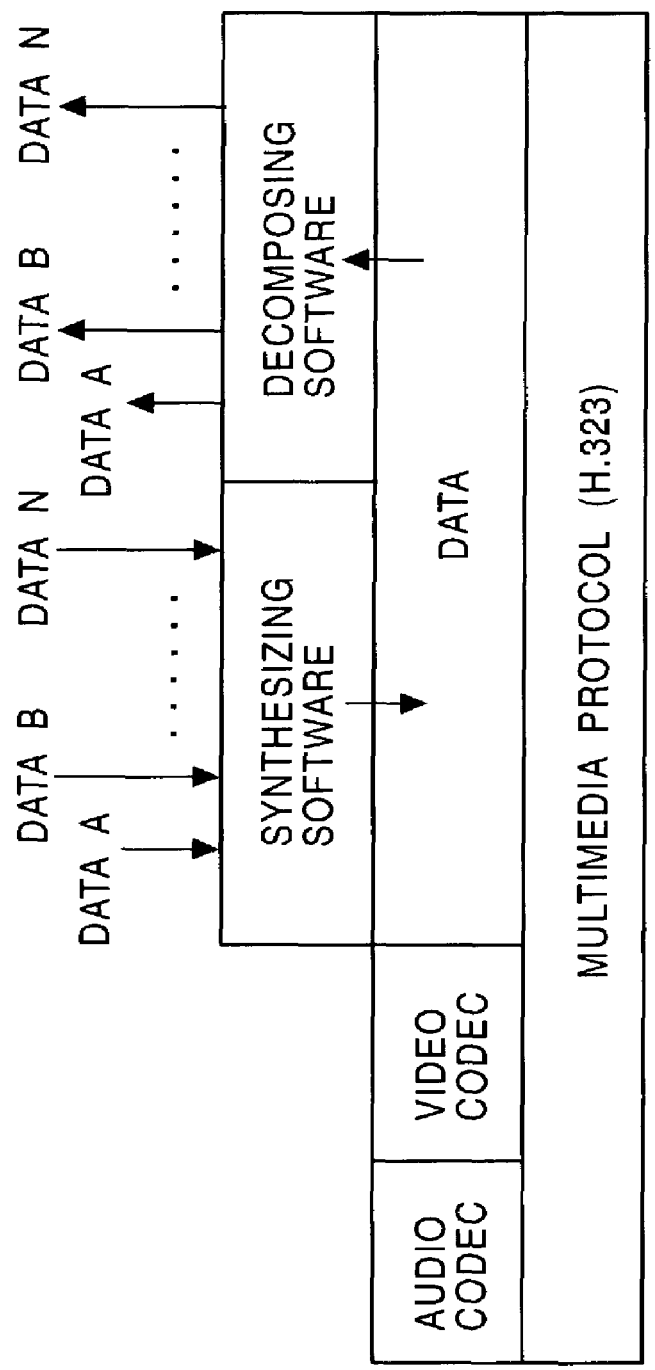
FIGS. 2A, 2B, 2C are illustrations of data structures for use in a data processor of a server used in the embodiment.

As FIG. 2A shows, as the main function of the multimedia server 1, in a protocol stack for treating user data in accordance with the multimedia protocol H.323, synthesizing software and decomposing software are included which transmit and receive user data A to N. Audio data can be processed by an audio codec, and video data can be processed by a video codec. Data to be processed as described above is provided to the multimedia server 1, and is all converted into H.323 specification data. The converted data is processed as described later.

Figure 2B:

For the data in accordance with H.323 as audiovisual communication specifications, data representing a "data type" is added as shown in FIG. 2B. Each of user data A to N, which has the data structure shown in FIG. 2B, is decomposed into the data structure shown in FIG. 2C. In this example, for each decomposed data item, a data number, link-flag data, sequence-number data, and data length are added, and a cyclic redundancy checksum (CRC) is finally added if needed.

Figure 3:
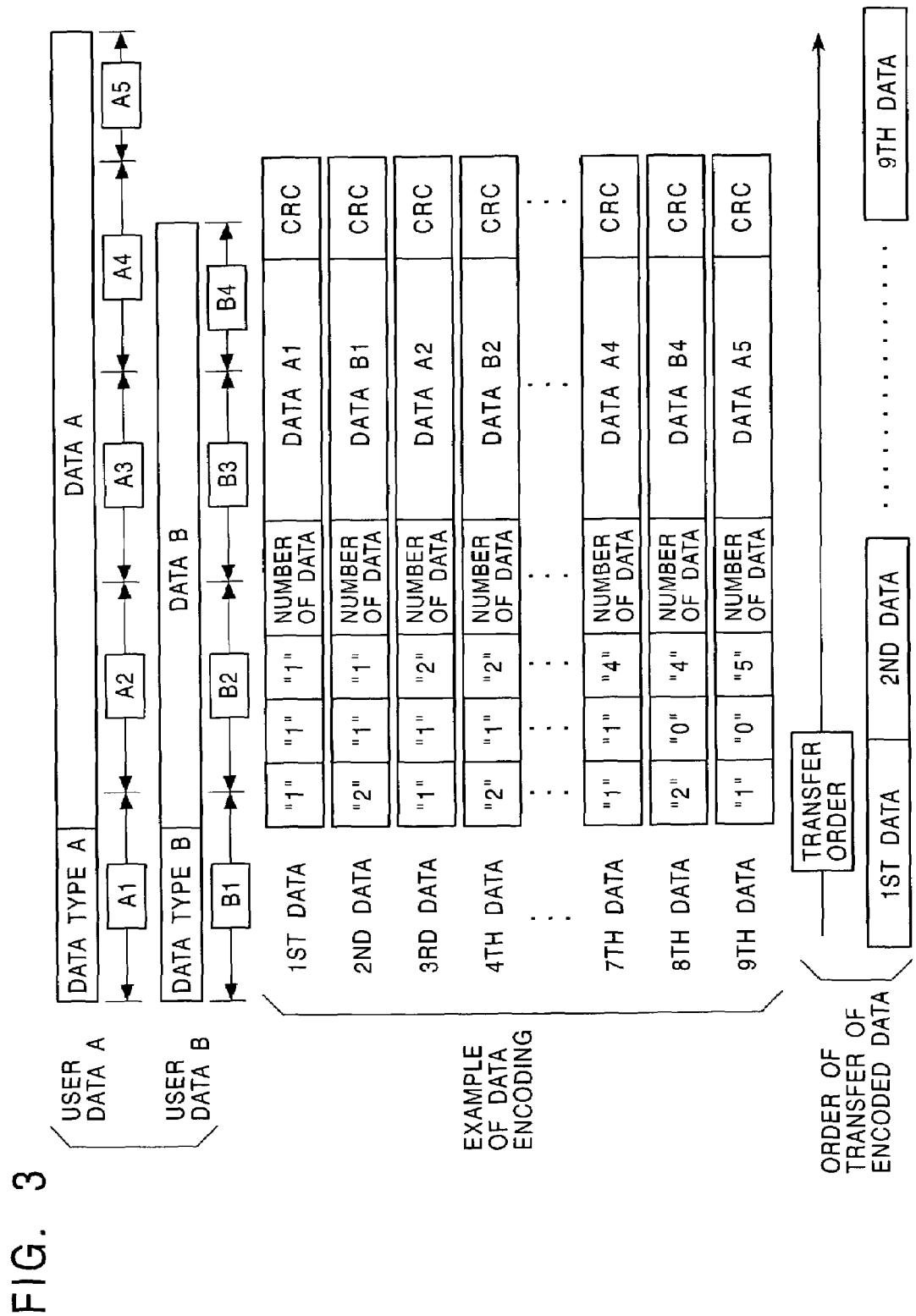
FIG. 3 is an illustration of data structures for use in the embodiment.

Processing is performed on the multimedia data types in accordance with the above data formats by the multimedia server 1, for example, as shown in FIG. 3. For brevity of description, FIG. 3 shows a case in which two types of data, user data A and user data B are processed. For user data A, a data type is added before the data part of user data A, as shown in FIG. 2B. The added data type indicates the type of user data A. Similarly, for user data B, a data type indicating the type of user data B is added. Each type of user data is equally divided depending on its data amount into, for example, 256-byte-unit packets. For example, user data A is divided into packets A1 to A5, and user data B is divided into packets B1 to B4. The end packet A5 of user data A and the end packet B4 of user data B are unused portions, and each have a data amount less than that of each of the other packets.

Figure 2C:
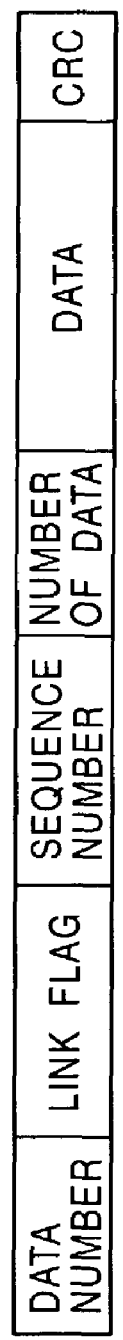

When the user data divided as described above is rearranged in accordance with the data format shown in FIG. 2C, a method entitled "example of data encoding" in FIG. 3 is performed. Specifically, for the "first data" formed by packet A1 of data A, "1" representing user data A is added as a data number. Next, "1" that indicates, as a link flag, that the first data is followed by consecutive data. After the link flag, "1" of "A1" which represents the order of the divided data in user data A is added as a sequence number. After that, a numerical value representing the number of data items in packet A1 is added, and then the data A itself is recorded. Finally, a CRC is added if needed.

Similarly, for the second data, the method adds "2" as a data number representing user data B, "1" as a link flag, "1" of "B1" as a sequence number, the number of data items in packet B1, and then the data B itself is recorded, and a CRC is added. After that, the third to seventh data are similarly rearranged. For the eighth data, "0" representing the last data of the data string of the data type B is added. For the ninth data, "0" representing the last data of the data string of the data type A is similarly added.

As described above, each user data is divided and is rearranged in an encoded form. As shown in the bottom part of FIG. 3, the first to ninth data are multiplexed and are sequentially transmitted. FIG. 3 shows that two user data items are divided and multiplexed, and are transmitted in parallel. However, the number of user data is arbitrary according to need, and the user data can be transmitted in accordance with the H.323 specifications by performing encoding similar to the above described.

In this transmission, by giving a priority level on transmission of each segment of multimedia information, segments of service data can sequentially be transmitted in accordance with the given priority levels. The priority levels can be determined based on the order in which segments of predetermined data are sent, an average transmission capacity usable by the service, etc. Predetermined priority levels may be set by a user or may be fixed in a default mode. Alternatively, the multimedia server 1 may have a function of dynamically changing the priority levels in response to one of a data capacity for a service and a user's request.

The receiving side can play back each segment of data by performing a process in reverse relative to that performed by the transmitting side, that is, decomposing the received data and combining the decomposed segments for each piece of user data. In this case, a user-side information terminal can receive all types of multimedia information if it has the H.323 data-processing function as a multimedia-data processing function. The user-side information terminal also has a function of notifying the multimedia server 1 of adapted protocols and functions, selectively notifying the multimedia server 1 of services, and providing an instruction for the user to determine the order in which pieces of information are sent.

Figure 4:
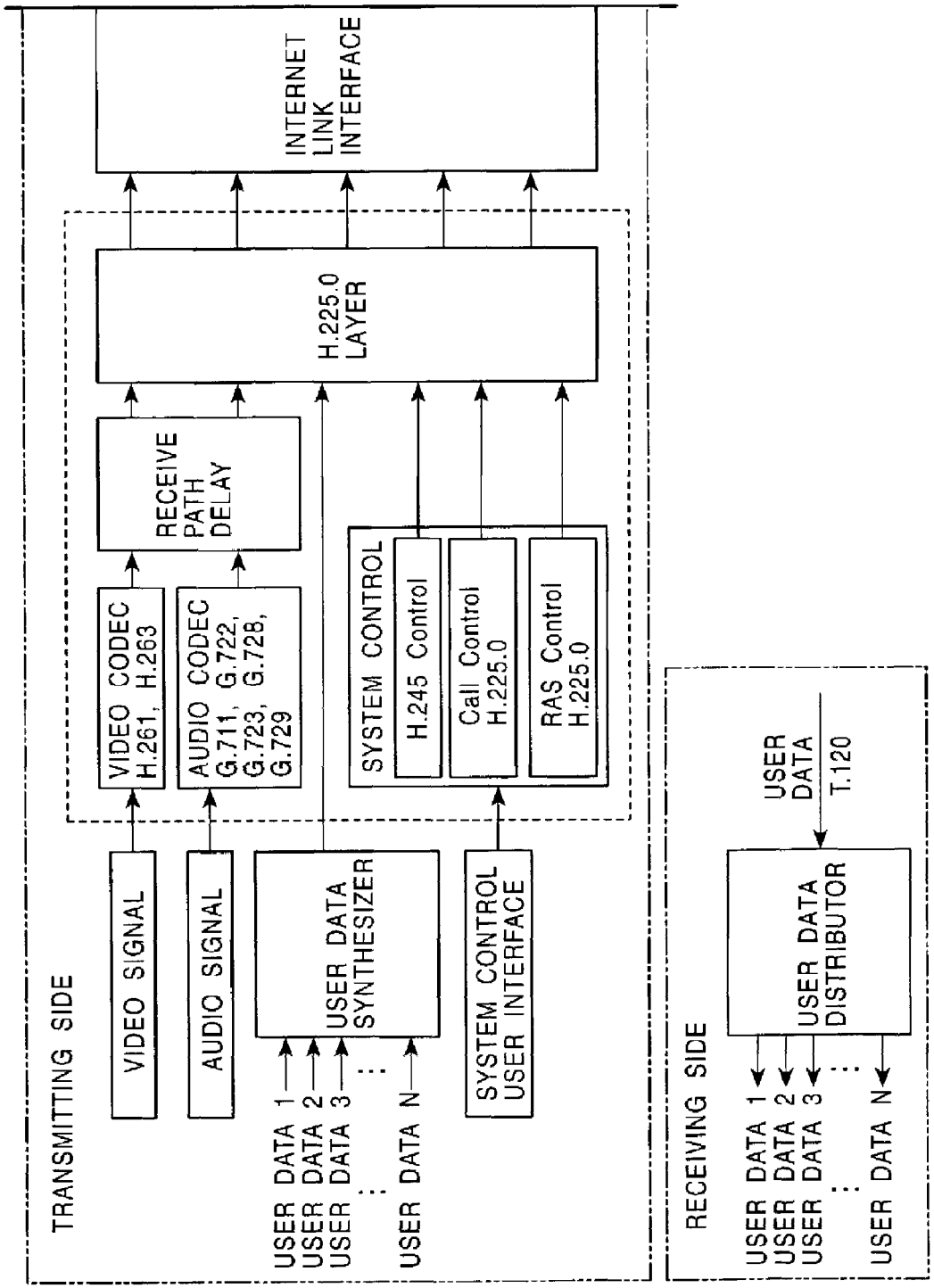
FIG. 4 is a block diagram showing a server used in the embodiment.

The above server functions can be implemented by, for example, the protocol configuration shown in FIG. 4. FIG. 4 shows a known server configuration using H.323 that is used in a videoconference system. A user data combining unit for combining input user data 1 to N is connected to an output-function portion of a system of the related art which executes various applications of the user, such as facsimile transmission and transmission of camera-moving data, and the synthesized data is output to an H.225.0 specification layer. As shown in FIG. 4, a video signal is supplied to a video codec, and an audio signal is supplied to an audio codec. The video codec and the audio codec process data of various types of specifications as indicated in FIG. 4. The processed data is provided as an output with various types of data for system control through an Internet-link interface.

As shown in FIG. 4, the receiving side operates in reverse relative to the transmitting side. Specifically, user data in accordance with the T.120 specifications is divided into user data 1 to N for distribution by a user-data distributor. This enables the output of videophone data from a user, a communication-navigation-request data, and a transmission request to a content provider.

By simply changing the above configuration in FIG. 4 so that various types of user data are externally provided to the user-data input portion of the system of the related art, facilitated transmission and reception of data can similarly be performed. In particular, the H.323 specifications used in the videoconference system are a type of real-time protocol. Accordingly, data in accordance with the H.323 specifications are suitable for use in transmission and reception in a combined form of video and audio to which the present invention is directed, for example, for use in a process for displaying a plurality of pictures on a single screen and arbitrarily changing the display form.

By employing the above data structure, data processing function, and data transmitting/receiving function, in the embodiment in FIG. 1, the multimedia server 1 communicates with the portable information terminal 2 in the vehicle 3 in accordance with the H.323 specifications for real-time multimedia communication by the IMT-2000 packet communication protocol. In this embodiment, user data A for videophone, user data B for communication navigation, user data C for i-mode, and user data D for video are decomposed and rearranged as described above, and the packets are transmitted in the order of A1, B1, C1, D1, A2, B2, C2, D2, etc. The portable information terminal 2 can display, on the map screen of a portable navigation device, other multimedia information in an arbitrary position such as a portion that is not directly related to the navigation function.

Unlike the common multimedia-information communication models shown in FIGS. 10A and 10B, and 11A and 11B, the present invention performing the above function enables the following functions: as FIG. 5A shows, data for communication navigation can be captured, as required, during videophone communication; as FIG. 5B shows, i-mode-packet-switching data can be captured and displayed during videophone communication; as FIG. 5C shows, streaming video data can be captured from the Internet while map data is being captured by communication navigation; and as FIG. 5D shows, videophone communication among persons can be performed, with two persons displayed, while communication navigation is operating.

Figure 6:
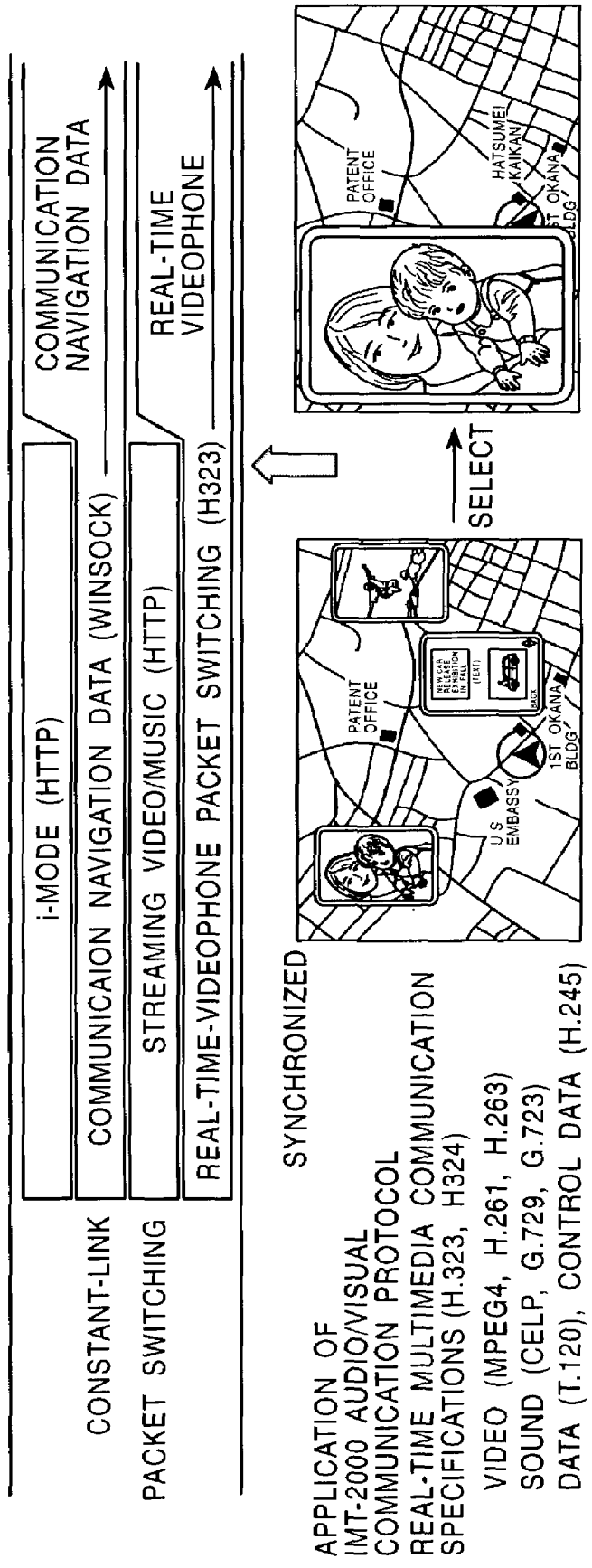
FIG. 6 is an illustration of a data stream in integrated multimedia communication enabled in the present invention.

Moreover, there is, for example, the communication system shown in FIG. 6 in which constant-link packet switching can be performed. In this system, by using the H.323 communication specifications or the H.324 streaming specifications in which the IMT-2000 audio/visual communication protocol is applied, the above types of multimedia data are captured in response to an instruction from the user, and from the captured data, arbitrary data can be selected for display by the user. As shown in FIG. 6, this makes it possible to display other information on a communication navigation screen according to necessity, and makes it possible to use half of the full screen to display an enlarge videophone screen in response to user's selection.

Figure 7:
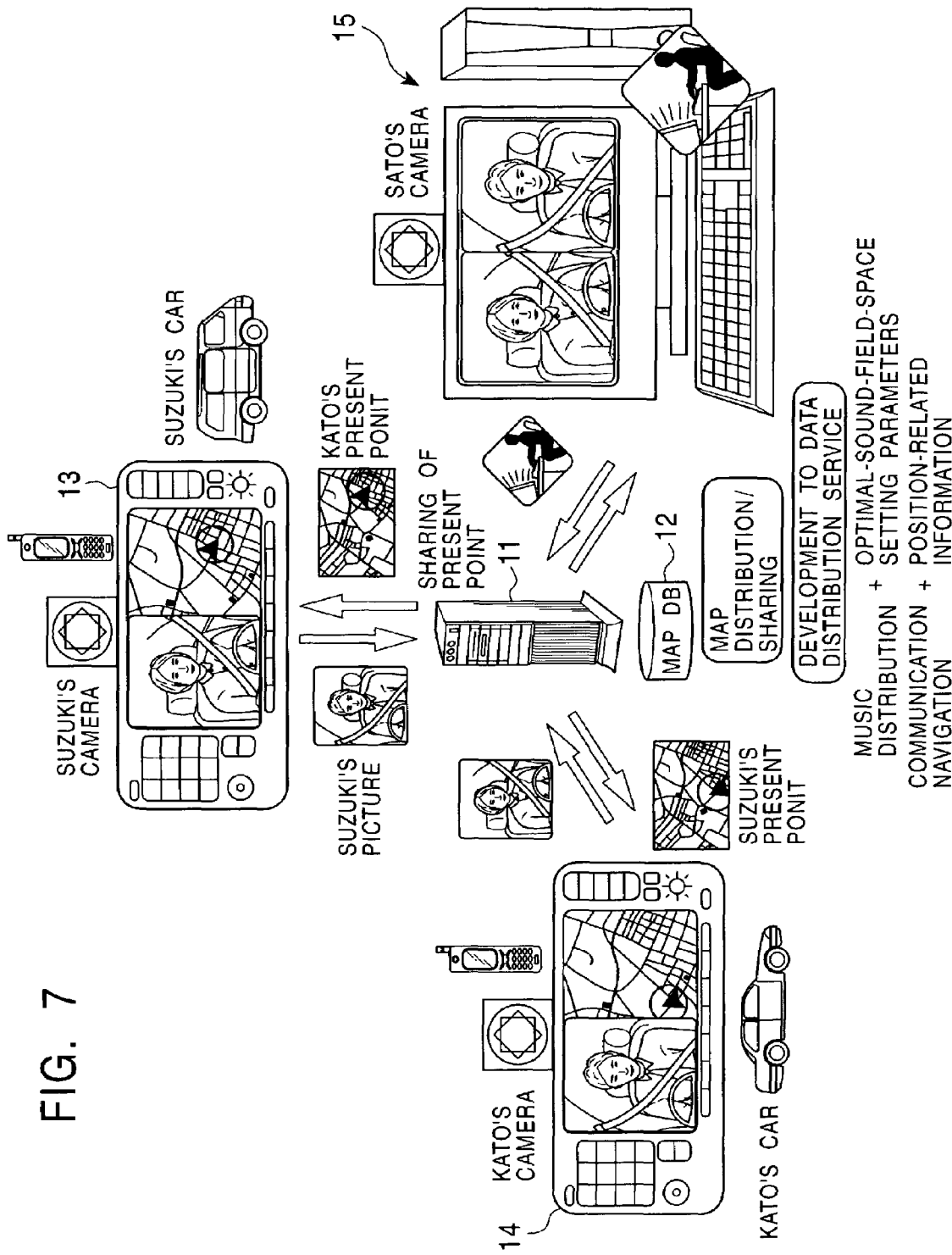
FIG. 7 is a schematic system illustration of the configuration and functions of devices according to another embodiment of the present invention.

The present invention can also be practiced in the form shown in FIG. 7. In this form, a server 11 includes a map database (DB) 12 and has a function of performing multimedia-data communication in an integrated form similar to the above-described server 1. FIG. 7 shows a case with Mr. Suzuki as a first user in Suzuki's car at the upper side, Mr. Kato as a second user in Kato's car at the left side, and Mr. Sato as a third user in an office at the right side are communicating with one another by videophone.

In this case, the server 11 can receive a present-position signal (GPS data) from a portable information terminal 13 of Mr. Suzuki as the first user which is linked to the server 11, and can transmit map data of the vicinity of the position with the desired timing. Suzuki's portable information terminal 13 can perform a navigation function by displaying a map based on the map information and the position of Suzuki's car and its traveling direction. Similarly, the server 11 can receive a present-position signal (GPS data) from a portable information terminal 14 of Mr. Kato as the second user which is linked to the server 11, and can output map data of the vicinity of the position. Kato's portable information terminal 14 can perform a navigation function by displaying a map based on the map data. Accordingly, in the case in FIG. 7, the map database 12 is shared by multiple users.

In each car, a videocamera is fixed in a predetermined position, and a hands-free set or the like is used for each user to perform the videophone function. For Mr. Sato as the third user in the office, a videocamera is fixed in a predetermined position, and Mr. Sato uses a microphone to perform the videophone function.

In the above hardware environments, when Mr. Suzuki and Mr. Kato, who are outside the office, are rushing to the office by car for a meeting to be held, for example, in fifteen minutes, Suzuki's videophone 13 displays Kato's picture on the videophone screen and enables Mr. Suzuki to have a conversation with Mr. Kato. In addition, map data representing the present position of Mr. Kato is transmitted from Kato's portable information terminal 14 to Suzuki's portable information terminal 13. Kato's picture and the map based on the map data can be switched and separately displayed, or can simultaneously be displayed. Accordingly, Mr. Suzuki can easily know the relationship on the map between the position of Suzuki's car and the position of Kato's car. Similarly, Kato's portable information terminal 14 displays Suzuki's picture on the videophone screen and enables Mr. Kato to have a conversation with Mr. Suzuki. Also, map information is transmitted from Suzuki's portable information terminal 13 to Kato's portable information terminal 14. The map information enables Mr. Kato to know the positional relationship of Kato's car with respect to Suzuki's car. In addition, on the screen of a personal computer 15 of Mr. Sato in the office, pictures of Mr. Suzuki and Mr. Kato, who are rushing by car, are displayed in response to an instruction from Mr. Sato.

By using this communication means and displayed information, as described above, each person can know, for example, a situation in which Mr. Kato will arrive in the office in ten minutes but Mr. Suzuki needs thirty more minutes due to a traffic jam. Accordingly, for example, Mr. Sato can ask Mr. Suzuki whether he can avoid the traffic jam by taking a detour, etc., and Mr. Sato can advise him if needed. Alternatively, if he is late, measures can be taken, such as delaying the meeting start time.

In this system, information can be shared by the three persons. This makes it possible to perform a mutual exchange of information and videophone communication among multiple persons. In addition, person-to-person information exchange can be performed. Also, the use of videoconference communication means facilitates mutual control of devices, such as positional control of another camera and the monitor's positional control. Similar to the above example, in addition to these pieces of information, various types of information can be captured, thus enabling developments to various data distribution services. This case also enables music distribution and the distribution to each car of parameters for forming an optimal sound field. In addition, the distribution of position-related information of peripheral facilities can be performed during the communication navigation.

Figure 8:
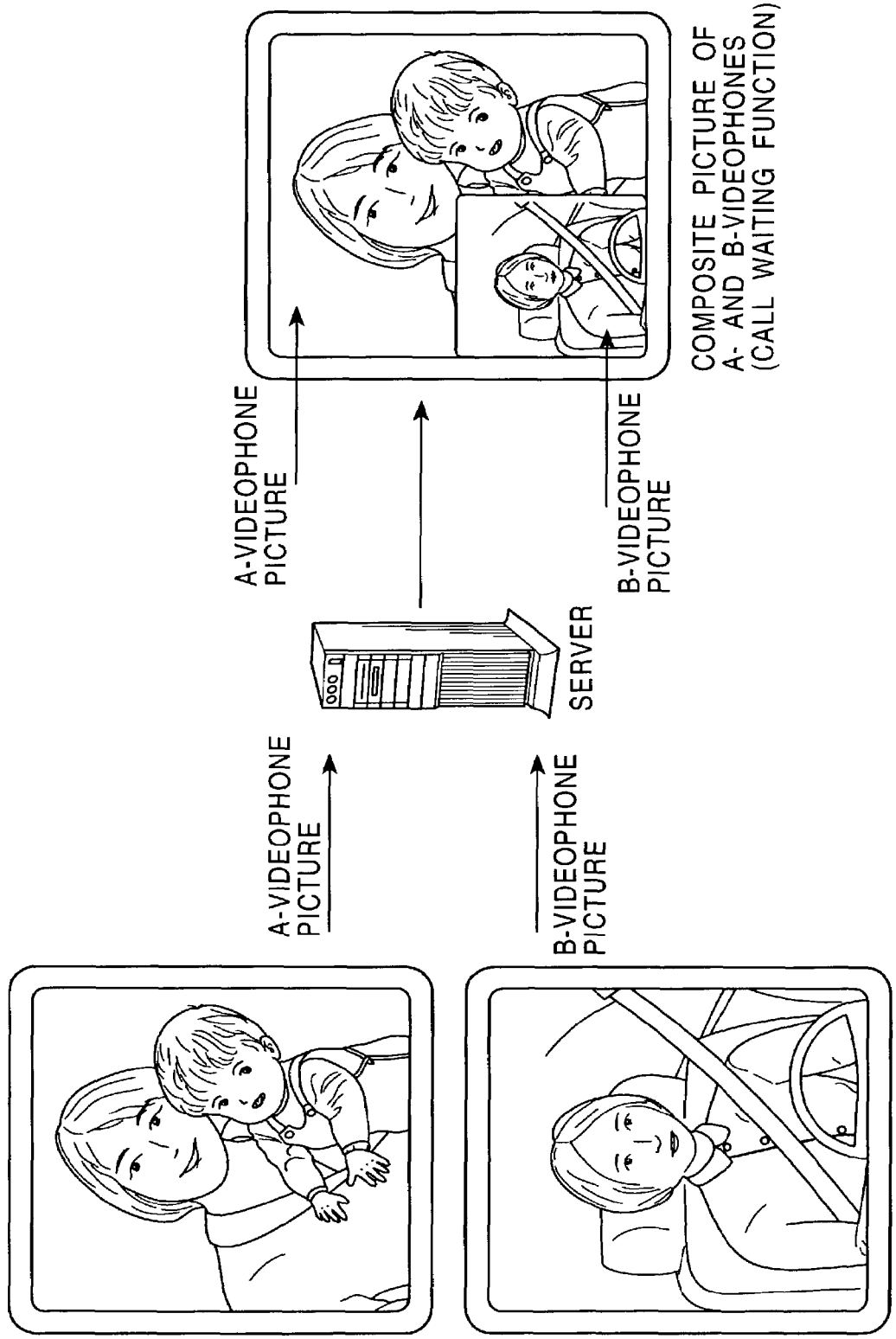
FIG. 8 is an illustration of an example of a videophone call-waiting function enabled in the present invention.

Moreover, compared with other systems, this system also facilitates a call waiting function in which, as FIG. 8 shows, when there are an A-videophone, a B-videophone, and a C-videophone, and the C-videophone has a call from the B-videophone during communication with the A-videophone, a B-videophone picture is displayed in a corner of the display screen of the C-videophone.

Figure 9:
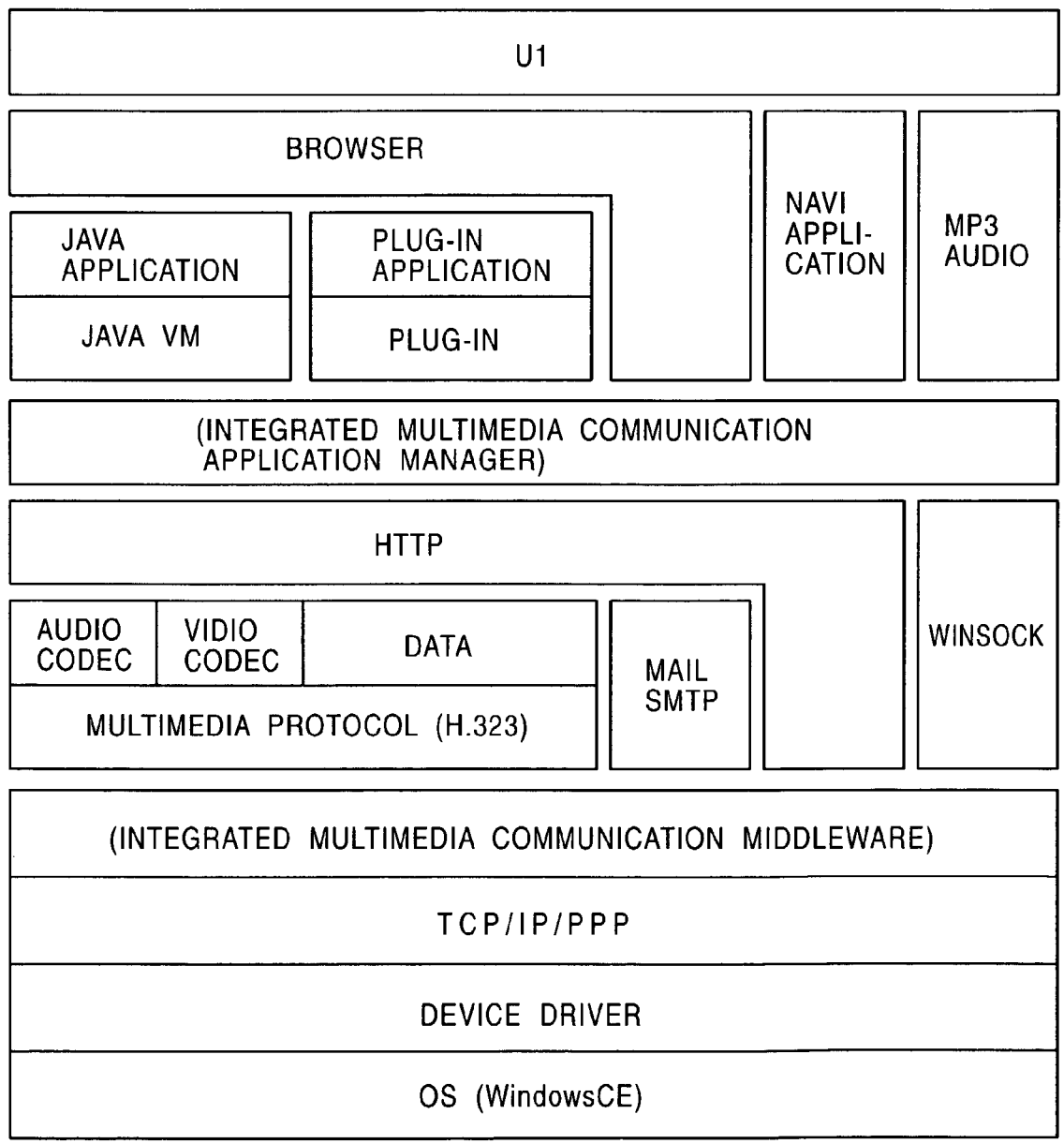
FIG. 9 is an illustration of the configuration of software used in the present invention.
Figure 10A:
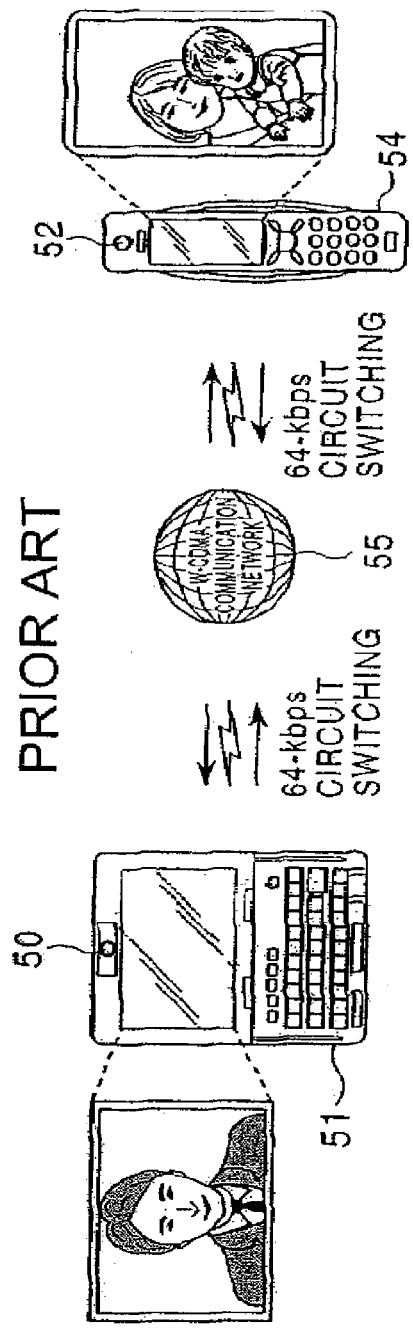
FIGS. 10A and 10B are illustrations of common communication models which are presently possible, where
Figure 10B:
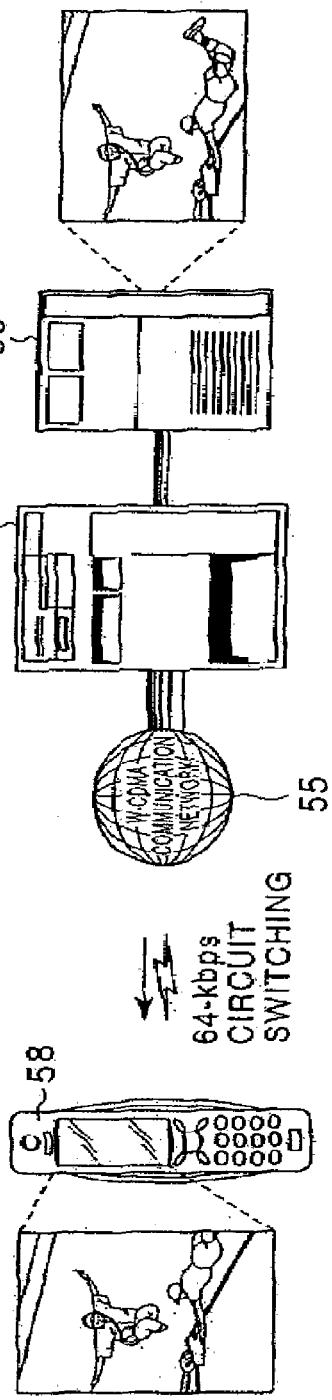
Figure 11A:
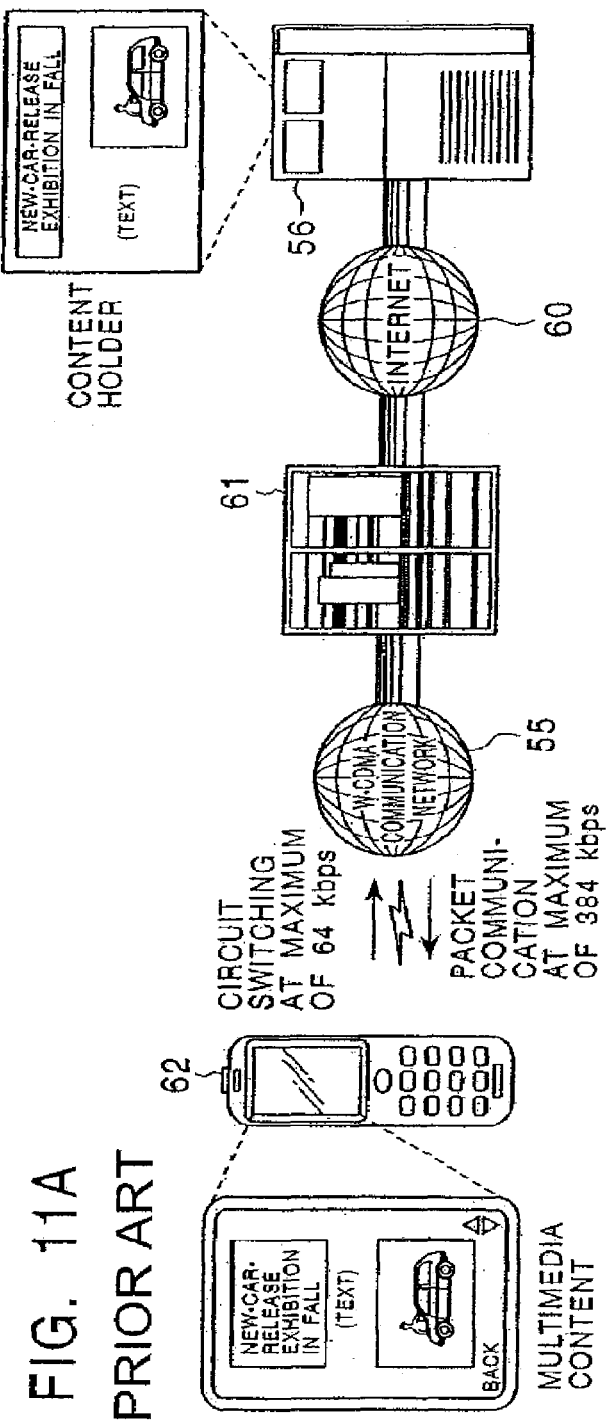
FIGS. 11A and 11B are illustrations of other common communication models which are presently possible, where
Figure 11B:
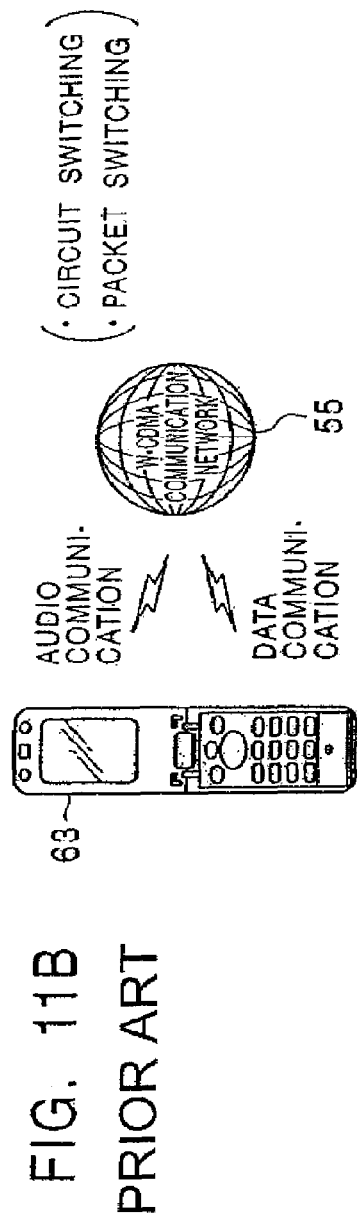
Figure 12:
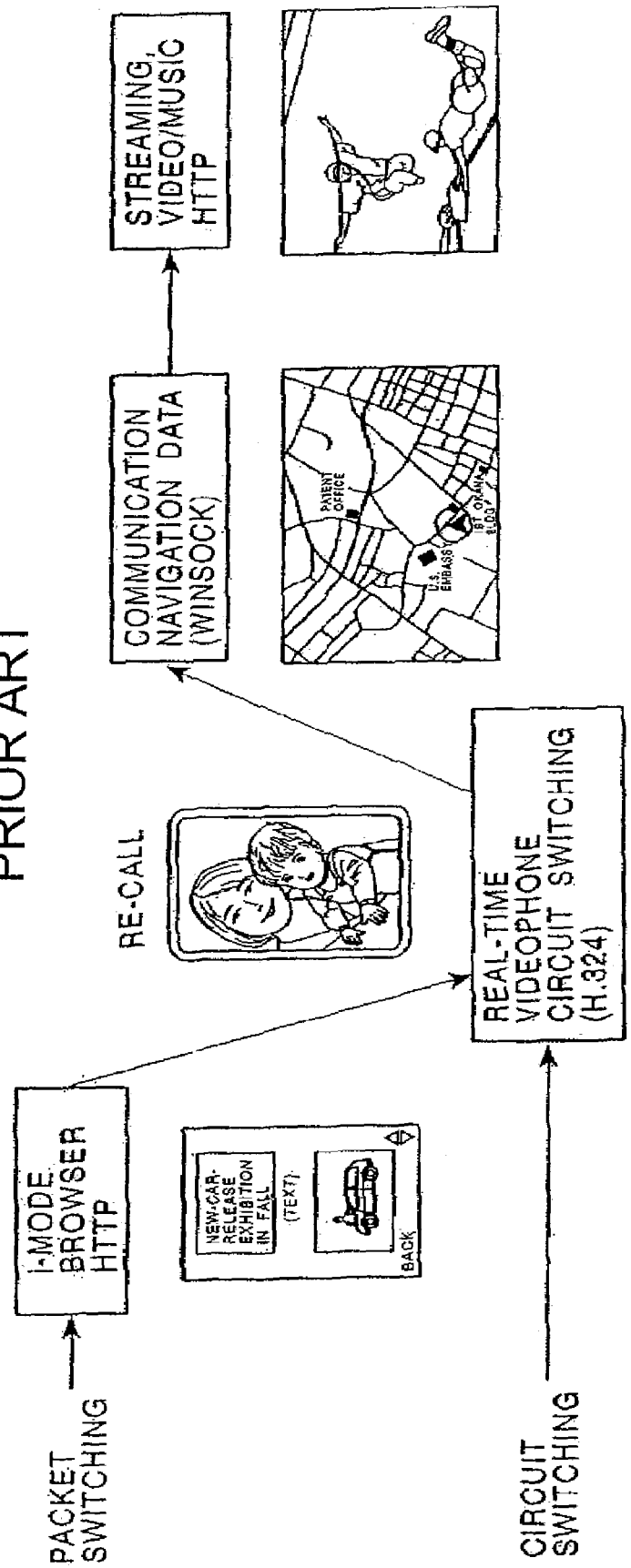
FIG. 12 is an illustration of a fifth common communication model in which sequential communication must be performed when IMT-2000 is directly used to display types of multimedia data.

Each of the servers 1 and 11 of the present invention that perform various processes can employ a software configuration as shown in, for example, FIG. 9. In particular, the server has a function of performing data processing by using the H.323 specifications for an integrated multimedia communication application, which is the core of the software configuration, and can also perform WinSock processing, HTTP processing, and mail SMTP processing. These use Windows CE as integrated multimedia communication middleware, include device drivers, and enable communication based on TCP/IP, PPP, etc. In addition, these process Java, and each include a plug-in function, a browser function, a navigation application, and an MP3 audio processing function. These form one embodiment of the present invention, and portions of the present invention other than the core of the present invention can be practiced in various modifications.

What is claimed is:

1. A multimedia information providing method comprising:

the acts, performed by a data processor, of:
receiving data of different types of communication specifications;
converting the received data into data of a single specification type;
adding an identifier to each of the data types and dividing the obtained data into data segments; and sequentially arranging the divided data segments in accordance with a data-transmission priority and transmitting the arranged data segments as a single data stream; and the acts, performed by an information terminal, of:
receiving the transmitted data segments;
re-dividing the received data segments into the divided data segments;
sequentially rearranging the divided data segments for each identifier;
providing the rearranged data segments for each identifier as an output; and
displaying multimedia information of a plurality of types on a single screen simultaneously.

2. A multimedia information providing method according to claim 1, wherein the single specification type is a streaming protocol.

3. A multimedia information providing method according to claim 2, wherein said streaming protocol is one of the H.323 communication protocol and the H.324 communication protocol.

4. A multimedia information providing method according to claim 1, wherein sequence numbers for each identifier are added to the divided data segments, and the data segments having sequence numbers added thereto are rearranged based on the identifier and the sequence numbers.

5. A multimedia information providing method according to claim 1, wherein the data of different types of communication specifications include Internet data, videophone data, and communication navigation data.

6. A multimedia information providing system comprising:
a data processor comprising:
data receiving means for receiving data of different types of communication specifications;
data converting means for converting the received data into data of a single specification type;
single-communication-specification-data dividing means for adding an identifier to each of the data types and dividing the obtained data into data segments;
single-communication-specifications-data arranging means for arranging the divided data segments in accordance with a data-transmission priority; and
data transmitting means for transmitting the arranged data segments as a single data stream; and
an information terminal comprising:
data receiving means for receiving the transmitted data segments;
re-dividing means for re-dividing the received data into the divided data segments;
sequentially rearranging the divided data segments for each identifier; and
data output means for providing the rearranged data segments for each identifier as an output, whereby a plurality of types of multimedia information are displayed on a single screen simultaneously.

7. A multimedia information providing system according to claim 6, wherein the single specification type is a streaming protocol, and said streaming protocol is one of the H.323 communication protocol and the H.324 communication protocol.

8. A multimedia information providing system according to claim 6, wherein sequence numbers for each identifier are added to the divided data segments, and the data segments having sequence numbers added thereto are rearranged based on the identifier and the sequence numbers.

9. A multimedia information providing system according to claim 6, wherein the data of different types of communication specifications include Internet data, videophone data, and communication navigation data.

10. A multimedia information providing system according to claim 6, wherein the data-transmission priority is one of a predetermined priority, a priority which is set beforehand by a user, a priority which is determined by a transmission-data capacity, and a priority which is changed in response to a request from the user.

11. A multimedia information providing system according to claim 6, wherein said information terminal is one of a cellular phone, a communication navigation device, and a portable information terminal.

12. A multimedia information providing system according to claim 6, wherein said information terminal notifies said data processor of one of a protocol and a function which are adapted for said information terminal.

* * * * *